(12) United States Patent
Vallet et al.

(10) Patent No.: US 10,688,828 B2
(45) Date of Patent: Jun. 23, 2020

(54) HYBRID REINFORCING ELEMENT WITH DIFFERENTIAL TWIST

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Solenne Vallet, Clermont-Ferrand (FR); Jérémy Guillaumain, Clarmont-Ferrand (FR)

(73) Assignee: Compagnie Generale des Etablissments Michelin, Clermont-Ferrand (FR)

( * ) Notice: Subject to any disclaimer, the term of this patent is extended or adjusted under 35 U.S.C. 154(b) by 374 days.

(21) Appl. No.: 15/554,583

(22) PCT Filed: Mar. 25, 2016

(86) PCT No.: PCT/EP2016/056702
§ 371 (c)(1),
(2) Date: Aug. 30, 2017

(87) PCT Pub. No.: WO2016/156263
PCT Pub. Date: Oct. 6, 2016

(65) Prior Publication Data
US 2018/0099529 A1   Apr. 12, 2018

(30) Foreign Application Priority Data

Mar. 31, 2015   (FR) ...................... 15 52699

(51) Int. Cl.
*B60C 9/00* (2006.01)
*D02G 3/48* (2006.01)

(52) U.S. Cl.
CPC ............... *B60C 9/005* (2013.01); *D02G 3/48* (2013.01)

(58) Field of Classification Search
CPC .................................. D02G 3/48; B60C 9/005
See application file for complete search history.

(56) References Cited

U.S. PATENT DOCUMENTS

| 3,419,060 A | 12/1968 | Stansfield | 152/359 |
| 3,603,071 A | 9/1971 | O'Neil et al. | 57/140 BY |

(Continued)

FOREIGN PATENT DOCUMENTS

| DE | 10 2008 037 615 A1 | 6/2010 |
| EP | 0 021 485 A1 | 1/1981 |

(Continued)

OTHER PUBLICATIONS

R. Cornille, U.S. Appl. No. 15/532,757, filed Dec. 7, 2015.

(Continued)

*Primary Examiner* — Shaun R Hurley
(74) *Attorney, Agent, or Firm* — Venable LLP (57) ABSTRACT

A reinforcing element includes a single strand of high-modulus textile monofilaments and a single strand of low-modulus textile monofilaments. The strand of high-modulus textile monofilaments and the strand of low-modulus textile monofilaments are wound around each other in a direction D3 with a twist R3. The strand of high-modulus textile monofilaments has a residual twist R1 in a direction D1. The strand of low-modulus textile monofilaments has a residual twist R2 in a direction D2. The residual twists R1 and R2 have a relationship such that:
when R2 is substantially non-zero, R1>R2, and
when R2 is substantially zero, R1 is substantially non-zero.

30 Claims, 4 Drawing Sheets

(56) References Cited

U.S. PATENT DOCUMENTS

| | | | |
|---|---|---|---|
| 3,977,172 A | 8/1976 | Kerawalla | 57/140 BY |
| 4,155,394 A | 5/1979 | Shepherd et al. | 152/359 |
| 4,234,030 A | 11/1980 | Van Nieuwal et al. | 152/354 R |
| 4,832,101 A * | 5/1989 | Welter | B60C 15/0072 152/527 |
| 4,877,073 A * | 10/1989 | Thise | B60C 9/0042 152/451 |
| 4,926,920 A | 5/1990 | Gouttebessis et al. | 152/548 |
| 5,558,144 A | 9/1996 | Nakayasu et al. | 152/527 |
| 6,093,490 A | 7/2000 | Meraldi et al. | 428/393 |
| 6,601,378 B1 * | 8/2003 | Fritsch | D02G 3/28 57/237 |
| 6,799,618 B2 * | 10/2004 | Reuter | B60C 9/2204 152/526 |
| 7,484,545 B2 * | 2/2009 | Westgate | B60C 9/0042 152/451 |
| 9,617,663 B2 * | 4/2017 | Jeon | D02G 3/48 |
| 2014/0051312 A1 | 2/2014 | Abad et al. | |
| 2014/0069563 A1 | 3/2014 | Le Clerc | D02G 3/48 |
| 2015/0239301 A1 | 8/2015 | Vallet et al. | B60C 17/00 |
| 2016/0082787 A1 | 3/2016 | Boen et al. | B60C 17/0009 |
| 2017/0327976 A1 | 11/2017 | Cornille et al. | |
| 2017/0327977 A1 | 11/2017 | Cornille et al. | |
| 2017/0327978 A1 | 11/2017 | Cornille et al. | |

FOREIGN PATENT DOCUMENTS

| | | |
|---|---|---|
| EP | 0 220 642 A1 | 5/1987 |
| EP | 0 225 391 A1 | 6/1987 |
| EP | 0 329 593 A1 | 8/1989 |
| EP | 0 335 588 A2 | 10/1989 |
| EP | 0 467 585 A1 | 1/1992 |
| EP | 2 551 127 A1 | 1/2013 |
| WO | WO 97/06294 A1 | 2/1997 |
| WO | WO 2012/104279 A1 | 8/2012 |
| WO | WO 2012/146612 A1 | 11/2012 |
| WO | WO 2014/057082 A1 | 4/2014 |

OTHER PUBLICATIONS

R. Cornille, U.S. Appl. No. 15/532,808, filed Dec. 7, 2015.
Jun. 3, 2016 International Search Report and Written Opinion in International Patent Appln. No. PCT/EP2016/056702.

* cited by examiner

HYBRID REINFORCING ELEMENT WITH DIFFERENTIAL TWIST

FIELD OF THE INVENTION

The invention relates to a reinforcing element, a tire, a semifinished product and a method of manufacturing such a reinforcing element.

RELATED ART

Textile reinforcing elements produced from continuous textile fibers or monofilaments, such as fibers made of polyester, nylon, cellulose or aramid, play an important part in tires, including in high-performance tires homologated to run at very high speed. In order to meet the requirements of the tires, the reinforcing elements need to exhibit high breaking strength, a high elastic modulus in tension, excellent fatigue endurance, and finally good adhesion to the matrices made of rubber or other polymers that they are liable to reinforce.

Reinforcing elements made up of two multifilament strands, each one made up of elementary textile monofilaments, are known from the prior art. The two strands of monofilaments are wound one about the other by twisting to form a plied yarn. Each strand comprising the textile monofilaments is generally referred to as a spun yarn or an overtwist depending on the stage in the manufacturing process.

The method of manufacturing these reinforcing elements is also well known from the prior art. During a first step, each spun yarn of textile monofilaments (more properly referred to as a "yarn") is first of all twisted individually on itself (with an initial twist $R1'$ and $R2'$ with $R1'=R2'$) in a given direction $D'$ (respectively in the S or Z direction, according to recognized terminology denoting the orientation of the turns according to the transverse bar of an S or of a Z) to form a strand or overtwist (more properly referred to as a "strand") in which the textile monofilaments find themselves deformed into a helix around the axis of the strand. Then, during a second step, the two strands, whether they comprise monofilaments made from identical or from different materials (the case of reinforcing elements said to be hybrid or composite), are then twisted together with a final twist $R3$ such that $R3=R1'=R2'$ in a direction $D3$ that is the opposite to the direction $D'$ (respectively Z or S direction) to obtain the cabled reinforcing element (more properly referred to as a "cord"). This reinforcing element is said to be twist-balanced because the two strands, in the final reinforcing element, have the same residual twist because $R1'=R2'$. This residual twist is zero or near-zero because $R3=R1'=R2'$ and the direction $D'$ is the opposite of the direction $D3$.

The purpose of the twisting is to adapt the properties of the material so as to create the transverse cohesion of the reinforcing element, increase its fatigue performance and also improve adhesion with the reinforced matrix Such reinforcing elements their constructions and methods of manufacture are well known to those skilled in the art. They have been described in detail in a great many documents, for example: EP021485, EP220642, EP225391, EP335588, EP467585, U.S. Pat. Nos. 3,419,060, 3,977,172, 4,155,394, 5,558,144, WO97/06294, or EP848767, or more recently, WO2012/104279, WO2012/146612, WO2014/057082.

In order to be able to reinforce tires or semifinished products comprising these reinforcing elements, the endurance or fatigue strength (in tension, bending, compression) and the breaking force of these reinforcing elements are of key importance. It is known that, in general, for a given material, the greater the twist used, the greater the endurance but that, on the other hand, the breaking strength in tension (referred to as tenacity when expressed per unit weight) decreases inexorably as the twist increases, something which is, of course, penalizing from the reinforcing standpoint.

Hence, the designers of reinforcing elements, like tire manufacturers, are constantly looking for reinforcing elements of which the mechanical properties in terms of endurance and breaking strength, for a given material and a given twist, can be improved.

BRIEF DESCRIPTION OF EMBODIMENTS OF THE INVENTION

To this end, one subject of the invention is a reinforcing element comprising a single strand of high-modulus textile monofilaments and a single strand of low-modulus textile monofilaments which are wound one around the other in a direction $D3$ with a twist $R3$, the strand of high-modulus textile monofilaments having a residual twist $R1$ in the direction $D1$, the strand of low-modulus textile monofilaments possibly having a residual twist $R2$ in the direction $D2$, the residual twists $R1$ and $R2$ being such that:

$R1 > R2$ when $R2$ is substantially non-zero $R1$ is substantially non-zero when $R2$ is substantially zero.

The reinforcing element according to the invention has a breaking strength that is equivalent to and an endurance that is an improvement on those of a balanced reinforcing element.

As recalled hereinabove, in the reinforcing elements of the prior art, increasing the twist $R3$ makes it possible to increase the endurance but at the expense of breaking strength. By contrast, in the reinforcing element according to the invention, the loss of breaking strength associated with the increase in twist $R3$ is compensated for by the residual twist $R1$ which is strictly higher than the residual twist $R2$ as demonstrated by the results of the comparative tests described hereinbelow.

What is meant by a substantially zero residual twist is that the residual twist is strictly below 2.5% of the twist $R3$. What is meant by a substantially non-zero residual twist is that the residual twist is greater than or equal to 2.5% of the twist $R3$.

What is meant by a high-modulus strand of textile monofilaments is a strand having a so-called final modulus strictly higher than 25 cN/tex. By contrast, what is meant by a low-modulus strand of textile monofilaments is a strand having a so-called final modulus less than or equal to 25 cN/tex. This definition applies equally to loomstate strands, which means to say strands without adhesive, and to adhesive-coated strands, which means to say strands covered with a layer of adhesive. In the case of adhesive-coated strands, this definition applies indifferently both to strands coming directly from manufacture and to the strands coming from reinforcing elements, whether these come directly from manufacture or have been extracted from semifinished products or tires.

The final modulus is measured from a force—elongation curve obtained at 20° C. in the known way using an "INSTRON" tensile test machine fitted with type "4D" grips (for rupture strength less than 100 daN) or type "4E" grips (for rupture strengths at least equal to 100 daN). The strand tested undergoes tensile testing over an initial length of 400 mm in the case of the 4D grips and 800 mm in the case of the 4E grips, at a nominal rate of 200 mm/min. All the results given are an average over 10 measurements.

Prior to tensile-testing the measured strand, a pre-twist, known as a "protective twist" equal to 100 twists per meter is applied, except to strands made of aramid and with a count greater than or equal to 330 tex and for which the pre-twist is equal to 80 twists per meter.

In the case of a force—elongation curve of substantially linear overall appearance, the final modulus is defined as the gradient at the point corresponding to 80% of the breaking strength from the force—elongation curve, divided by the thread count of the strand. In the case of a force—elongation curve of substantially non-linear overall appearance, for example one that has one or more points of inflection, the final modulus is defined as being the gradient between two points A and B on the force—elongation curve, divided by the thread count of the strand, the point A corresponding to 40% of the breaking strength of the strand and the point B corresponding to 60% of the breaking strength of the strand.

The count (or linear density) of the strand is determined in accordance with standard ASTM D1423. The count is given in tex (weight, in grams, of 1000 m of product—remembering that: 0.111 tex is equal to 1 denier).

Each strand of textile monofilaments comprises a plurality of elementary textile monofilaments which may potentially be interlaced with one another. Each strand comprises between 50 and 2000 monofilaments.

In the case of a reinforcing element coming directly from manufacture or taken from a semifinished product or from a tire, each residual twist R1, R2 is determined by untwisting the reinforcing element, making it possible to obtain R3, and then by untwisting each strand, making it possible to obtain R1 and R2. Each twist R1, R2, R3 is determined in accordance with standard ASTM D 885/D 885MA of, January 2010 (paragraph 30), for example using a torsionmeter.

In the embodiment of the invention in which R2 is substantially zero, the invention allows a significant improvement in the breaking strength while at the same time maintaining endurance equivalent to that of a balanced reinforcing element having a twist R3 identical to the invention.

In the embodiment of the invention in which R2 is substantially non-zero, the invention allows a significant improvement in the endurance while at the same time maintaining a breaking strength equivalent to that of a balanced reinforcing element having a twist R3 lower than that of the invention.

Advantageously, the final modulus of the high-modulus strand of textile monofilaments is greater than or equal to 30 cN/tex, preferably greater than or equal to 35 cN/tex and more preferably greater than or equal to 40 cN/tex.

Advantageously, the final modulus of the low-modulus strand of textile monofilaments is less than or equal to 20 cN/tex, preferably less than or equal to 15 cN/tex and more preferably less than or equal to 10 cN/tex.

Advantageously, the ratio of the final modulus of the high-modulus strand of textile monofilaments to the final modulus of the low-modulus strand of textile monofilaments is greater than or equal to 2, preferably greater than or equal to 5, and more preferably greater than or equal to 7. In advantageous embodiments of the invention, this ratio is less than or equal to 15 and preferably less than or equal to 10.

In the present application the term "textile" or "textile material" in very general terms means any material made of a substance other than a metallic substance, whether it is natural or synthetic, which is capable of being transformed into a thread, fibre or film by any appropriate transformation process. Mention may be made, for example, without the examples below being limiting, of a polymer spinning process, such as, for example, melt spinning, solution spinning or gel spinning.

Although materials made of a non-polymeric substance (for example made of a mineral substance such as glass or made of a non-polymeric organic substance such as carbon) are included in the definition of the textile material, the invention is preferably carried out with materials made of a polymeric substance, of both thermoplastic and non-thermoplastic type.

By way of examples of polymer materials of the thermoplastic or non-thermoplastic type, mention may for example be made of celluloses, notably rayon, polyvinyl alcohols (abbreviated to "PVAs"), polyketones, aramids (aromatic polyamides), aromatic polyesters, polybenzazoles (abbreviated to "PBOs"), polyimides, polyesters, notably those selected from among PET (polyethylene terephthalate), PEN (polyethylene naphthalate), PBT (polybutylene terephthalate), PBN (polybutylene naphthalate), PPT (polypropylene terephthalate), PPN (polypropylene naphthalate).

In one embodiment, when R2 is substantially non-zero, the directions D1 and D2 are identical.

Advantageously, the directions D1, D2 and D3 are identical when R2 is substantially non-zero and the directions D1 and D3 are identical when R2 is substantially zero. This then is a method of manufacture that is more rapid and less expensive. This is because the twists R1' and R2' that need to be applied to each strand are reduced to the strict minimum. Specifically, in this embodiment, the residual twists R1 and R2 result from the fact that the twists R1' and R2' are completely used up in the final twist R3, unlike in a method in which the twists R1' and R2' are greater than (or equal to) R3 and in which the residual twists R1 and R2 stem from the surplus of twists R1' and R2'.

In one preferred embodiment, the high-modulus textile monofilaments are made of aromatic polyamide, preferably of aramid.

Regarding the aramid monofilament, it will be recalled that, as is well known, this is a monofilament of linear macromolecules formed of aromatic groups held together by aramid bonds of which at least 85% are directly connected to two aromatic cores, and more particularly fibers made of poly(p-phenylene terephthalamide) (or PPTA), which have been being manufactured for a long time from optically anisotropic spinning compositions.

In one preferred embodiment, the low-modulus monofilaments are made from a material selected from celluloses, polyvinyl alcohols, polyketones, aliphatic polyamides, polyesters, polybenzazoles, polyimides and mixtures of monofilaments of these materials, preferably selected from aliphatic polyamides polyesters and mixtures of monofilaments of these materials.

Regarding the polyester monofilament, it will be recalled that, as is well known, this is a monofilament of linear macromolecules formed of groups held together by ester bonds. Polyesters are produced by polycondensation by esterification between a carboxylic diacid, or one of the derivatives thereof, and a diol. For example, polyethylene terephthalate can be manufactured by the polycondensation of terephthalique acid and ethylene glycol.

Regarding the nylon monofilament, it will be recalled that, as is well known, this is a monofilament of macromolecules obtained from a synthetic polyamide chain in which the amide bonds bond directly to one or more aliphatic or cyclo-aliphatic groups. One example of nylon is poly-(hexamethylene adipamide).

As is well known to those skilled in the art, the twists can be measured and expressed in two different ways, either simply in terms of the number of twists per meter (t/m), or, and this is more rigorous when wishing to compare materials of different types (densities) and/or different counts, in terms of the helix angle of the monofilaments or, and this is equivalent, in terms of a twist factor K.

Advantageously, R3 ranges from 200 to 450 twists per meter, preferably from 250 to 400 twists per meter. The twist R3 governs the endurance of the reinforcing element. Thus, a suitable twist R3 can be chosen according to the desired endurance. The higher the twist R3, the better the endurance. Thus, a twist R3 ranging from 280 to 400 twists per meter will more preferably be chosen.

Advantageously, the reinforcing element has a twist factor ranging from 130 to 200, preferably from 140 to 190. Such a twist factor makes it possible to obtain a reinforcing element that is durable and has a high breaking strength, and in which the twist and the counts of the strands are compatible with high production rates.

The twist factor K of the reinforcing element is connected to the twist R3 of the reinforcing element according to the known relationship which follows:

$$K=(\text{Twist } R3) \times [(\text{Count } T3/(1000 \cdot \rho 3)]^{1/2}$$

in which the twist R3 is expressed in twists per meter (t/m), the count T3=T1+T2 is expressed in tex (the weight, in grams, of 1000 m), and finally ρ3 is the density or mass per unit volume (in g/cm$^3$) of the material of which the reinforcing element is made (for example, approximately 1.50 g/cm$^3$ for cellulose, 1.44 g/cm$^3$ for aramid, 1.38 g/cm$^3$ for a polyester such as PET, 1.14 g/cm$^3$ for nylon). In the case of a hybrid reinforcing element of the invention, ρ3 is, of course, a mean of the densities ρ1 and ρ2 of the high-modulus and low-modulus monofilament strands weighted by the respective counts T1 and T2 of these strands:

$$\rho 3 = (\rho 1 \cdot T1 + \rho 2 \cdot T2)/(T1+T2).$$

Advantageously, R1 ranges from 10 to 150 twists per meter, preferably from 20 to 120 twists per meter, and more preferably from 50 to 110 twists per meter. For too high a residual twist R1, too high a modulus would be obtained for the reinforcing element, particularly at low elongations, and this would lead to problems in the method of manufacture of the tire. By contrast, too low a residual twist R1 does not make it possible to compensate for the loss in breaking strength resulting from the twist R3 that provides the endurance.

In the embodiment in which R2 is substantially non-zero, R2 ranges from 10 to 100 twists per meter, preferably from 15 to 75 twists per meter and more preferably from 20 to 60 twists per meter.

Advantageously, the ratio R1/R3 ranges from 0.05 to 0.45, preferably from 0.10 to 0.40, preferably from 0.13 to 0.40, more preferably from 0.13 to 0.36 and more preferably still from 0.20 to 0.35. Such R1/R3 ratios make it possible to obtain, for a given twist R3, good endurance of the reinforcing element and a satisfactory breaking strength while at the same time maintaining an elongation at break that is great enough that it does not lead to problems with the method of manufacturing the tire, notably when shaping the tire.

Advantageously, the product R1·R3 is greater than or equal to 3000, preferably greater than or equal to 15000, preferably greater than or equal to 30000 and even more preferably greater than or equal to 44000. Specifically, the higher R3 is, the better the endurance of the reinforcing element. The lower R1' is, and, therefore, the higher R1 is, the better the breaking strength. Thus, the higher the value of the product R1·R3, the better both the endurance and the breaking strength of the reinforcing elements are. However, the higher R3 is, the greater the risk of spread on the value of the breaking strength of the reinforcing elements. Thus, advantageously, the product R1·R3 is less than or equal to 48000. By limiting the value of the product R1·R3 to 48000, the risk of industrial variability of the breaking strength is reduced.

Advantageously, the ratio R3/R2 and R3 satisfy R3/R2 ranging from 0.10 to 10.50 and R3 ranging from 200 to 450 twists per meter, preferably R3/R2 ranging from 2.00 to 8.25 and R3 ranging from 250 to 400 twists per meter, preferably R3/R2 ranging from 2.00 to 7.10 and R3 ranging from 280 to 400 twists per meter. More preferably still, R3/R2 and R3 satisfy R3/R2 ranging from 3.20 to 8.75 and R3 ranging from 235 to 375 twists per meter. In the R3/R2 intervals and for the R3 values described above, the compromise between the breaking strength and endurance is improved.

Advantageously, the ratio R1/R2 ranges from 1.90 to 10.00, preferably from 1.90 to 5.00 and more preferably from 1.90 to 2.50.

In one embodiment, the count T1 of the high-modulus strand of textile monofilaments ranges from 90 to 400 tex, preferably from 100 to 350 tex, and more preferably from 140 to 210 tex.

In another embodiment, the count T2 of the low-modulus strand of textile monofilaments ranges from 80 to 350 tex, preferably from 90 to 290 tex, and more preferably from 120 to 190 tex, end-points included.

Such counts T1 and T2 are compatible with use in a tire. Lower counts would not have a high enough breaking strength, whereas higher counts would lead to reinforcing elements that were too fat and difficult to use in a tire.

The force at break of the reinforcing element is greater than or equal to 30 daN, preferably greater than or equal to 35 daN. The higher the breaking strength, the better its resistance to attack, notably attack of the "road hazard" type, including for example potholes and kerbing. The breaking strength, measured in accordance with the standard ASTM D 885/D 885MA of January 2010, can also be determined from loomstate reinforcing elements, which means to say elements with no adhesive, just as it can from adhesive-coated reinforcing elements, which means to say elements coated with a layer of adhesive. In the case of adhesive-coated reinforcing elements, the determination may be performed indifferently either using reinforcing elements taken directly from manufacture or using reinforcing elements taken from semifinished products or tires.

Another subject of the invention is a semifinished product comprising a reinforcing element as defined above embedded in an elastomer matrix. One example of a semifinished product according to the invention is a ply of reinforcing elements comprising the reinforcing elements embedded in an elastomer matrix formed by skimming the reinforcing elements between two elastomer skims.

A further subject of the invention is a tire comprising at least one reinforcing element as defined above.

The tires of the invention in particular may be intended for motor vehicles of the passenger, 4×4 and SUV (Sport Utility Vehicle) type, but also for two-wheel vehicles, such as motorcycles, or for industrial vehicles chosen from vans, "heavy" vehicles—i.e., underground trains, buses, heavy road transport vehicles (lorries, towing vehicles, trailers), off-road vehicles—agricultural or civil engineering machines, and other transport or handling vehicles.

Preferably, the tires may be intended for motor vehicles of passenger, 4×4 or "SUV" (Sport Utility Vehicle) type.

In one embodiment, with the tire comprising two beads each comprising at least one annular reinforcing structure and a carcass reinforcement anchored in each of the beads by a turnup around the annular reinforcing structure, the carcass reinforcement comprises at least one reinforcing element as defined hereinabove.

In another embodiment, with the tire comprising two beads each comprising at least one annular reinforcing structure and a carcass reinforcement anchored in each of the beads by a turnup around the annular reinforcing structure, the tire comprising a crown reinforcement arranged radially on the outside of the carcass reinforcement, the crown reinforcement comprising a working reinforcement and a hoop reinforcement which is arranged radially on the outside of the working reinforcement, the hoop reinforcement comprises at least one reinforcing element as defined hereinabove.

For preference, the hooping ply comprises the hooping textile reinforcing elements as defined hereinabove and substantially parallel to one another. Such hooping reinforcing elements form an angle of at most equal to 10°, preferably ranging from 5° to 10°, with the circumferential direction of the tire.

In yet another embodiment, with the tire comprising two beads each comprising at least one annular reinforcing structure and a carcass reinforcement anchored in each of the beads by a turnup around the annular reinforcing structure, the tire comprising a sidewall reinforcement, the sidewall reinforcement comprises at least one reinforcing element as defined hereinabove.

In one particularly advantageous embodiment, the tire is designed to be a run-flat tire.

Specifically, for several years, tire manufacturers have sought to eliminate the need for the presence of a spare wheel on board the vehicle while at the same time guaranteeing that the vehicle will be able to continue its journey despite a significant or complete loss of pressure from one or more of the tires. That for example allows a service centre to be reached without the need to stop, under circumstances that are often hazardous, in order to fit the spare wheel.

One envisaged solution is the use of run-flat tires which are provided with self-supporting sidewalls (sometimes referred to by their trade designations "ZP" for "zero pressure" or "SST" for "self supporting tire").

When the inflation pressure is close to the service pressure (this is then referred to as "normal running" mode), it is desirable for the tire to exhibit performance, referred to as "IM" (inflated mode) running performance, that is as good as possible. This IM running performance includes, amongst other things, the mass, the rolling resistance or even the comfort.

When the inflation pressure is significantly reduced in comparison with the service pressure, or is even zero (this is then referred to as "run-flat" mode), the tire must make it possible to cover a given distance at a given speed. This performance, referred to as "EM" (extended mobility) running performance, is required by legislation or by motor vehicle manufacturers in order to allow the producer to advertise the tire as being a run-flat tire. This performance is largely dependent on the endurance of the reinforcing elements of the carcass reinforcement, which endurance is advantageously high thanks to the reinforcing elements according to the invention.

The invention is particularly advantageous in the case of a reinforcing element in which the high-modulus strand is made up of aramid monofilaments and the low-modulus strand is made up of polyester monofilament. Specifically, the reinforcing element has a relatively low modulus at low deformations (in normal running mode), in this instance that of polyester, which proves to be sufficient to provide IM running performance. The reinforcing element has a relatively high modulus at high deformations (in run-flat mode), in this instance that of aramid, which proves to be sufficient to, on its own, provide EM running performance.

Such a tire designed for running flat preferably comprises a sidewall insert positioned axially on the inside of the carcass reinforcement.

Advantageously, the carcass reinforcement comprises a single carcass ply.

The presence of a single carcass ply makes it possible to obtain a tire with a carcass reinforcement that is more flexible than a tire with a carcass reinforcement that comprises two carcass plies. Thus, the vertical stiffness of the tire is reduced and the comfort thereof is improved, thus, in the case of a tire designed to run flat, bringing it closer to the level of comfort of a standard tire that does not have self-supporting sidewalls.

Another subject of the invention is a method for manufacturing a reinforcing element as described hereinabove, in which method:

the high-modulus strand of textile monofilaments with an initial twist $R1'$ in a direction $D1'$ is obtained;

the low-modulus strand of textile monofilaments with an initial twist $R2'$ in a direction $D2'$ is obtained;

the high-modulus and low-modulus strands of textile monofilaments are wound one around the other in a direction $D3$ with a twist $R3$ so that:

the high-modulus strand of textile monofilaments has a residual twist $R1$ in a direction $D1$; and the low-modulus strand of textile monofilaments has a residual twist $R2$ in a direction $D2$;

the residual twists $R1$ and $R2$ being such that:

$R1>R2$ when $R2$ is substantially non-zero $R1$ is substantially non-zero when $R2$ is substantially zero.

In one preferred embodiment, $R1'<R2'$.

In one preferred embodiment, $R1'<R3$.

For preference, $D1'$ and $D2'$ are identical.

Advantageously, $D3$ is the opposite of $D1'$ and $D2'$.

For preference, $R1'<R3$ and $R2'<R3$.

BRIEF DESCRIPTION OF THE DRAWINGS

The invention will be better understood from reading the following description, which is given solely by way of non-limiting example and with reference to the drawings in which.

DETAILED DESCRIPTION OF EMBODIMENTS OF THE INVENTION

When using the term "radial", a distinction should be made between several different uses of the word by the person skilled in the art. Firstly, the expression refers to a radius of the tire. It is in that sense that a point A is said to be "radially inside" a point B (or "radially on the inside of" the point B) if it is closer to the axis of rotation of the tire than is the point B. Conversely, a point C is said to be "radially outside" a point D (or "radially on the outside of" the point D) if it is further from the axis of rotation of the tire than is the point D. Progress "radially inwards (or outwards)" will mean progress towards smaller (or larger) radii. It is this sense of the word that applies also when radial distances are being discussed.

On the other hand, a reinforcing element or a reinforcement is said to be "radial" when the reinforcing element or the reinforcing elements of the reinforcement make an angle greater than or equal to 65° and less than or equal to 90° with the circumferential direction.

Finally, a "radial cross section" or "radial section" here means a cross section or a section in a plane which contains the axis of rotation of the tire.

An "axial" direction is a direction parallel to the axis of rotation of the tire. A point E is said to be "axially inside" a point F (or "axially on the inside of" the point F) if it is closer to the median plane of the tire than is the point F. Conversely, a point G is said to be "axially outside" a point H (or "axially on the outside of" the point H) if it is further from the median plane of the tire than is the point H.

The "median plane" of the tire is the plane which is perpendicular to the axis of rotation of the tire and which lies at equal distances from the annular reinforcing structures of each bead.

A "circumferential" direction is a direction which is perpendicular both to a radius of the tire and to the axial direction.

Examples of a Tire According to the Invention

Figure 1:
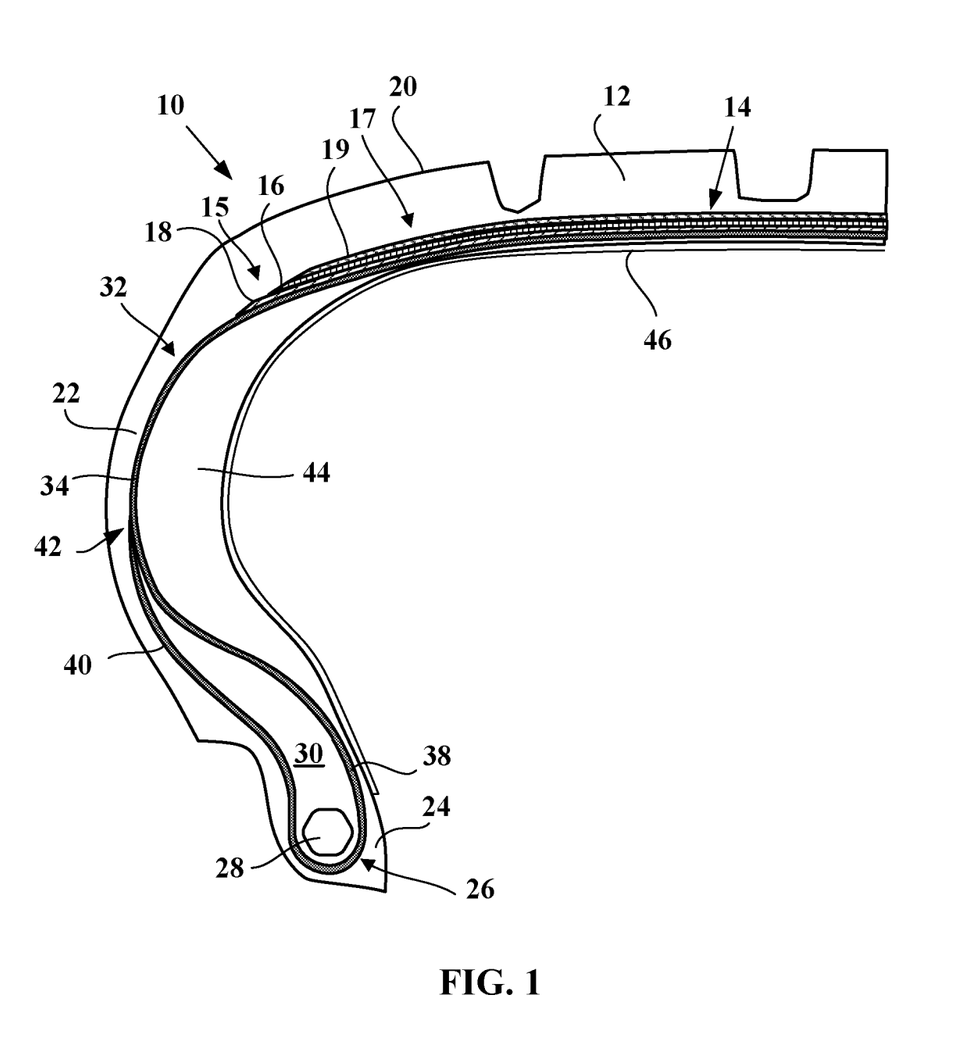
FIG. 1 is a view in radial section of a tire designed to run flat according to a first embodiment of the invention.

FIG. 1 schematically depicts, viewed in radial section, a tire according to a first embodiment of the invention denoted by the general reference 10. The tire 10 is of the run-flat type. The tire 10 is for a passenger vehicle.

The tire 10 comprises a crown 12 comprising a crown reinforcement 14 comprising a working reinforcement 15 comprising two working plies 16, 18 and a hooping reinforcement 17 comprising a hooping ply 19. The crown reinforcement 14 is surmounted by a tread 20. Here, the hooping reinforcement 17 is arranged radially on the outside of the working reinforcement 15. The hooping reinforcement 17 is interposed radially between the working reinforcement 15 and the tread 20. Two self-supporting sidewalls 22 extend the crown 12 radially inwards.

The tire 10 further comprises two beads 24 radially on the inside of the sidewalls 22 and each comprising an annular reinforcing structure 26, in this instance a bead wire 28, surmounted by a mass of bead apex filling rubber 30, and also a radial carcass reinforcement 32.

The carcass reinforcement 32 preferably comprises a single carcass ply 34 of reinforcing elements 36, the carcass reinforcement 32 being anchored in each of the beads 24 by a turn-up around the annular reinforcing structure 26, so as to form, within each bead 24, a main strand 38 extending from the beads through the sidewalls towards the crown, and a turn-up 40, the radially outer end 42 of the turn-up 40 being substantially midway up the height of the tire. The carcass reinforcement 32 extends from the beads 24 through the sidewalls 22 towards the crown 12. The crown reinforcement 14 is arranged radially on the outside of the carcass reinforcement 32. Thus, the crown reinforcement 14 is radially interposed between the carcass reinforcement 32 and the tread 20.

The rubber compositions used for the crown plies 16, 18 and carcass ply 34 are conventional compositions for the calendering of reinforcing elements, typically based on natural rubber, carbon black, a vulcanization system and the usual additives. The textile reinforcing element and the rubber composition which coats it are bonded together for example using a standard adhesive of RFL type.

The tire 10 also comprises two sidewall inserts 44, arranged axially on the inside of the carcass reinforcement 32. These inserts 44 with their characteristic crescent-shaped radial cross section are intended to reinforce the sidewall. They comprise at least one polymer composition, preferably a rubber blend. Document WO 02/096677 gives several examples of rubber blends that can be used to form such an insert. Each sidewall insert 44 is capable of helping to support a load corresponding to a portion of the weight of the vehicle during a run-flat situation.

The tire also comprises an airtight inner layer 46, preferably made of butyl, located axially on the inside of the sidewalls 22 and radially on the inside of the crown reinforcement 14 and extending between the two beads 24. The sidewall inserts 44 are located axially on the outside of the inner layer 46. Thus, the sidewall inserts 44 are positioned axially between the carcass reinforcement 32 and the inner layer 46.

The hooping ply 19 comprises hooping textile reinforcing elements 36 according to the invention that form an angle of at most equal to 10°, preferably ranging from 5° to 10°, with the circumferential direction Z of the tire 10. As an alternative, reinforcing elements not in accordance with the invention could be used. Such reinforcing elements comprise, for example, two strands of textile monofilaments made of a heat-shrink material, for example in this instance of polyamide-6,6, each strand consisting of two 140-tex spun yarns which have been twisted together (on a direct cabling machine) at 250 twists/meter.

Figure 2:
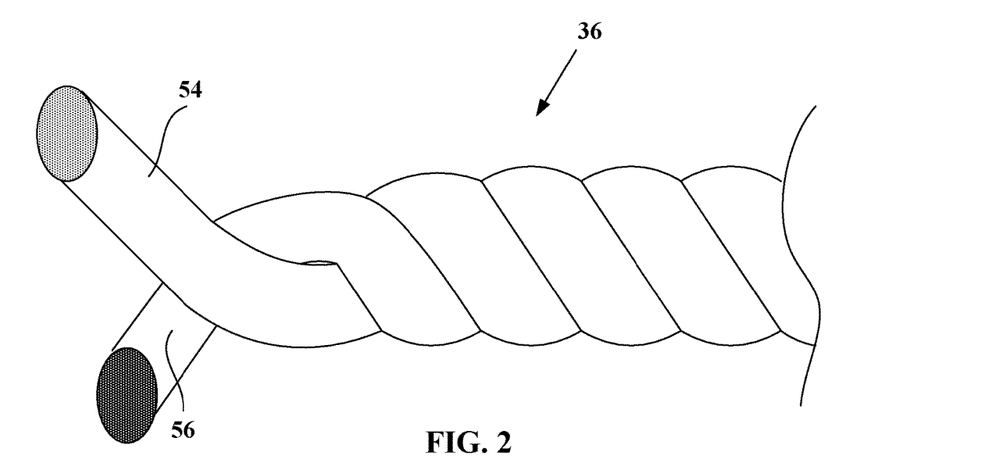
FIG. 2 illustrates a detail view of a reinforcing element of the tire of FIG. 1.

The carcass ply 34 comprises textile reinforcing elements 36 according to the invention, one of which is illustrated in FIG. 2. The reinforcing elements 36 are parallel to one another. Each reinforcing element 36 is radial. In other words, each reinforcing element 36 extends in a plane substantially parallel to the axial and radial directions of the tire 10.

Each reinforcing element 36 comprises a single high-modulus strand 54 of textile monofilaments, here made of an aromatic polyamide, for example of aramid, and a single low-modulus strand 56 of textile monofilaments, here made of polyester or of aliphatic polyamide, for example of polyester, wound together in a helix one around the other in a direction D3 with a twist R3. Each reinforcing element 36 is made up of a strand 54 and of a strand 56.

Here, the direction D3 is the S direction. The twist R3 of the reinforcing element 56 ranges from 200 to 450 twists per meter, preferably from 250 to 400 twists per meter, more preferably from 280 to 400 twists per meter, and here R3=340 twists per meter.

The polyester is selected from polyethylene terephthalate, polyethylene naphthalate, polybutylene terephthalate, polybutylene naphthalate, polypropylene terephthalate or polypropylene naphthalate. In this instance, the polyester is polyethylene terephthalate (PET).

The count T1 of the high-modulus strand 54 of monofilaments ranges from 90 to 400 tex, preferably from 100 to 350 tex, and more preferably from 140 to 210 tex. Here, T1=167 tex. The count T2 of the low-modulus strand 56 of monofilaments ranges from 80 to 350 tex, preferably from 90 to 290 tex, and more preferably from 120 to 190 tex. Here, T2=144 tex.

The high-modulus strand 54 of monofilaments has a substantially non-zero residual twist R1 in the direction D1. The low-modulus strand 56 of monofilaments has a residual twist R2 in the direction D2. According to the invention, R1>R2 when R2 is substantially non-zero, and R1 is substantially non-zero when R2 is substantially zero.

The residual twist R1 of the high-modulus strand 54 of monofilaments ranges from 10 to 150 twists per meter, preferably from 20 to 120 twists per meter, and more preferably from 50 to 110 twists per meter. Here, R1=100 twists per meter.

The residual twist R2 of the low-modulus strand 56 of monofilaments ranges from 10 to 100 twists per meter, preferably from 15 to 75 twists per meter, and more preferably from 20 to 60 twists per meter so that the condition R1>R2 or R1>0 is met, depending on whether R2 is substantially non-zero or zero. Here, R2=50 twists per meter.

Here, since R2 is substantially non-zero, D1 and D2 are identical. Preferably, D1, D2 and D3 are identical and in this instance are the S direction.

When R2 is substantially zero, D1 and D3 are identical.

The ratio R1/R3 ranges from 0.05 to 0.45, preferably from 0.10 to 0.40, preferably from 0.13 to 0.40, more preferably from 0.13 to 0.36 and more preferably still, from 0.20 to 0.35. Here, R1/R3=0.29.

The product R1·R3 is greater than or equal to 3000, preferably greater than or equal to 15000, preferably greater than or equal to 30000. Here R1·R3=34000. In other embodiments, R1·R3 is greater than or equal to 44000. The product R1·R3 is less than or equal to 48000.

The reinforcing element 36 is such that the ratio R3/R2 and the value of R3 satisfy R3/R2 ranging from 0.10 to 10.50 and R3 ranging from 200 to 450 twists per meter, preferably R3/R2 ranging from 2.00 to 8.25 and R3 ranging from 250 to 400 twists per meter, preferably R3/R2 ranging from 2.00 to 7.10 and R3 ranging from 280 to 400 twists per meter. More preferably still, R3/R2 and R3 satisfy R3/R2 ranging from 3.20 to 8.75 and R3 ranging from 235 to 375 twists per meter. Here, R3/R2=6.80, for R3=340 twists per meter.

Furthermore, the reinforcing element 36 is such that the ratio R1/R2 ranges from 1.90 to 10.00, preferably from 1.90 to 5.00 and more preferably from 1.90 to 2.50. Here, R1/R2=2.00.

The reinforcing element 36 has a twist factor K ranging from 130 to 200, preferably from 140 to 190. Here, K=160.

The final modulus Mf1 of the high-modulus strand 54 of textile monofilaments is greater than or equal to 30 cN/tex, preferably greater than or equal to 35 cN/tex and more preferably greater than or equal to 40 cN/tex. Here, Mf1=64.5 cN/tex.

The final modulus Mf2 of the low-modulus strand 56 of textile monofilaments is greater than or equal to 20 cN/tex, preferably greater than or equal to 15 cN/tex and more preferably greater than or equal to 10 cN/tex. Here, Mf2=7.1 cN/tex.

The ratio Mf1/Mf2 of the final modulus of the high-modulus strand 54 of textile monofilaments to the final modulus of the low-modulus strand 56 of textile monofilaments is greater than or equal to 2, preferably greater than or equal to 5, and more preferably greater than or equal to 7. For preference, Mf1/Mf2 is less than or equal to 15 and preferably less than or equal to 10. Here, Mf1/Mf2=9.1.

The force at break of the reinforcing element 36 is greater than or equal to 30 daN, preferably greater than or equal to 35 daN. Here, Fr=37.5 daN on the reinforcing element 36 coated with a layer of adhesive, for example a layer of adhesive of RFL type and Fr=38.1 daN on the loomstate reinforcing element 36 with no layer of adhesive.

The values described above are measured on direct-from-manufacture reinforcing elements. As an alternative, the values described above are measured on reinforcing elements extracted from a semifinished product or from a tire.

Figure 3:
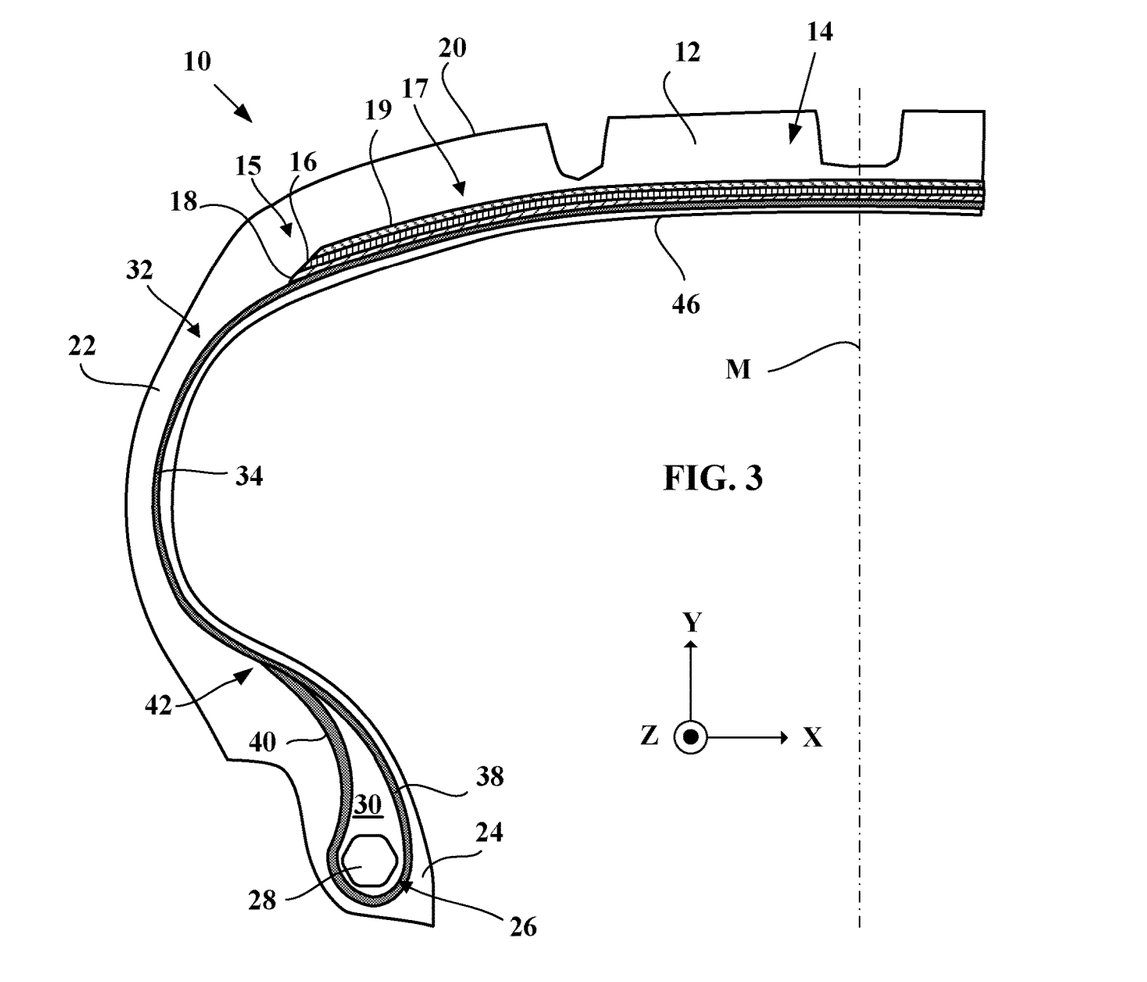
FIGS. 3 and 4 are views similar to that of FIG. 1 of tires respectively according to second and third embodiments.
Figure 4:
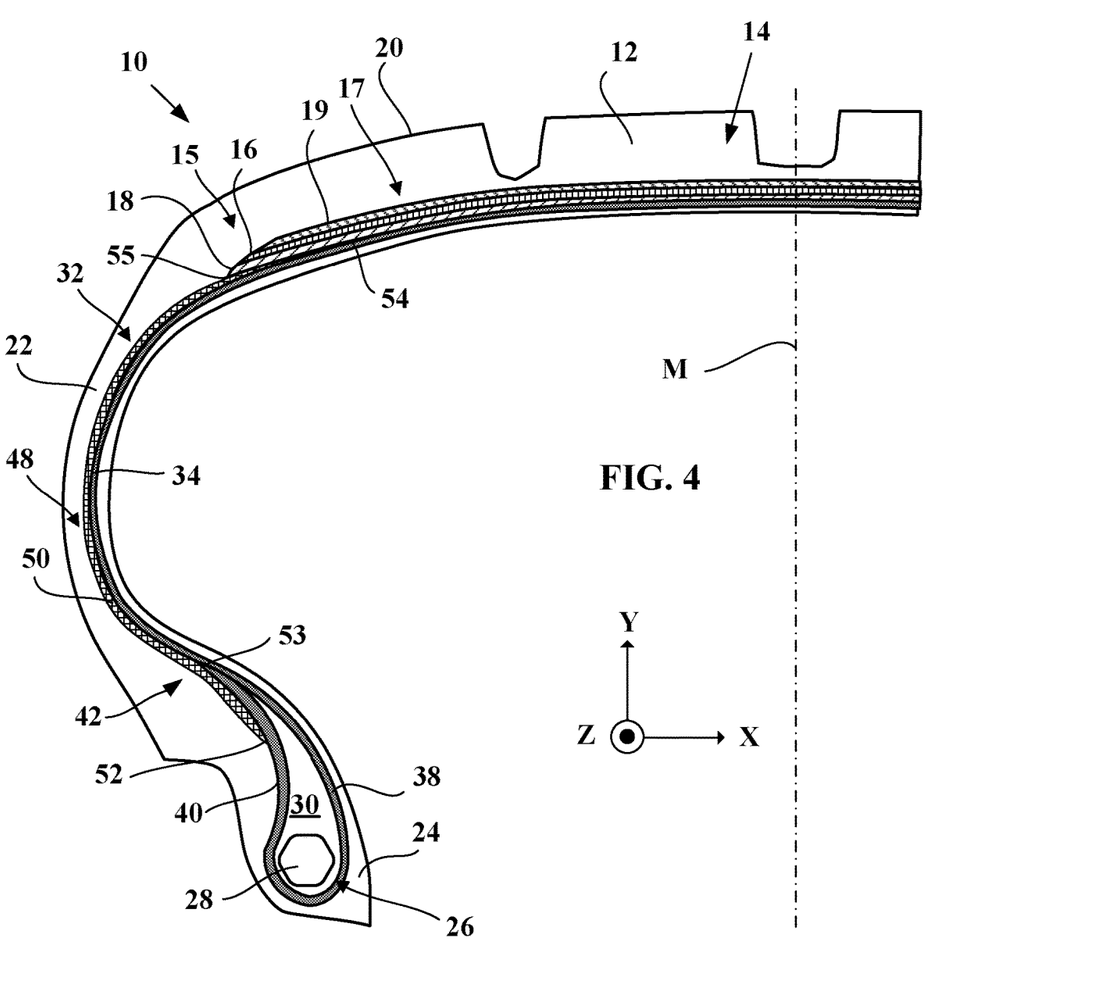

FIGS. 3 and 4 depict tires according to second and third embodiments of the invention respectively. Elements similar to those of the first embodiment are denoted by identical references.

Unlike the tire 10 of the first embodiment, the tire 10 according to the second embodiment in FIG. 3 is not designed to run flat. Therefore it does not have the sidewall inserts 44.

In an alternative form, the tire 10 of the second embodiment comprises hoop reinforcing elements according to the invention. In another alternative form, the tire 10 of the second embodiment comprises hoop reinforcing elements not in accordance with the invention.

Unlike the tire of the second embodiment, the tire 10 according to the third embodiment in FIG. 4 comprises a sidewall reinforcement 48 preferably comprising a single sidewall reinforcing ply 50.

The sidewall reinforcement 48 is arranged axially on the outside of the main strand 38 and extends, within each bead 24, axially on the outside of the turnup 40 of the carcass ply 34. As an alternative, the sidewall reinforcement 48 may be arranged radially between the main strand 38 and the turnup 40 of the carcass ply 34.

The radially inner end 52 of the sidewall reinforcement 48 is radially on the inside of the radially outer end 53 of the turnup 40 of the carcass reinforcement 32. The radially outer end 54 of the sidewall reinforcement 25 is axially on the inside of the axially outer end 55 of the crown ply radially adjacent to the sidewall reinforcement 48, in this instance the radially innermost working ply 18. Other configurations of the ends 52 and 54 with respect to the ends 53 and 55 are possible and described for example in WO2014040976.

In this third embodiment, the sidewall reinforcement comprises reinforcing elements according to the invention.

It is also possible to conceive of a tire according to the third embodiment comprising hooping reinforcing elements which may or may not be in accordance with the invention and carcass reinforcing elements which may or may not be in accordance with the invention.

Method of Manufacturing the Reinforcing Element

A method of manufacturing a reinforcing element 36 will now be described. The method according to the invention can be implemented using ring-type threading machines well known to those skilled in the art but can also be implemented using direct cabling machines.

In a step of obtaining the high-modulus strand 54 of textile monofilaments, the starting point is a high-modulus spun yarn of textile monofilaments and this spun yarn is twisted in a direction D1' with an initial twist of R1'. This yields the strand 54.

In another step, this time of obtaining the low-modulus strand 56 of textile monofilaments, the starting point is a low-modulus spun yarn of textile monofilaments and this spun yarn is twisted in a direction D2' with an initial twist of R2'. This yields the strand 56.

Each spun yarn (more properly referred to as "yarn"), in the initial state, which means to say without any twist; is formed in the well-known way of a plurality of elementary textile monofilaments, typically several tens to several hundreds, of very fine diameter generally less than 25 μm. Within each strand 54', 56', the textile monofilaments find themselves deformed into a helix around the axis of the fiber strand.

D1' and D2' are identical and here are the Z direction. In addition, R1'<R2' where here R1'=240 twists per meter and R2'=290 twists per meter.

The high-modulus and low-modulus strands 54, 56 of textile monofilaments are then wound around one another in a direction D3 with a twist R3 so that, on the one hand, the high-modulus strand of textile monofilaments has a residual twist R1, in this instance substantially non-zero, in a direction D1 and, on the other hand, the low-modulus strand of textile monofilaments has a residual twist R2 in a direction D2. The residual twists R1 and R2 are such that R1>R2 when R2 is substantially non-zero, and R1 is substantially non-zero when R2 is substantially zero. In this instance, in the example of the reinforcing element 36, R1>R2.

To this end, the strands 54, 56 are wound with a twist R3 such that R1'<R3 and R2'<R3 and where here R3=340 twists per meter in the direction D3 which is the opposite of the directions D1' and D2'.

Comparative Tests and Measurements

Characteristics of the reinforcing element 36 according to the invention, of another reinforcing element 37 according to the invention, and of other reinforcing elements that act as comparative examples are compared in Table 1. For all these reinforcing elements, T1=167 tex and T2=144 tex. The PET is marketed by the company Hyosung under the trade name HSP40 NAA. The aramid is marketed by the company Teijin under the trade name Twaron 1000.

The breaking strengths, determined in accordance with the standard ASTM D 885/D 885MA of January 2010, are measured at 20° C. on loomstate reinforcing elements, (which means to say elements with no adhesive) which have been subject to prior conditioning. "Prior conditioning" means the storage of the reinforcing elements (after drying) for at least 24 hours, prior to measurement, in a standard atmosphere in accordance with European standard DIN EN 20139 (temperature of 20+/−2° C.; relative humidity of 65+/−2%).

The count (or linear density) of the elementary strands or of the reinforcing elements is determined in accordance with standard ASTM D1423. The count is given in tex (weight, in grams, of 1000 m of product—remembering that: 0.111 tex is equal to 1 denier).

The endurance is determined by conducting a bending endurance test in accordance with ASTM D430-06 (method A), during which test a semifinished product comprising several reinforcing elements embedded in an elastomer matrix is made to move back and forth in contact with a pulley. After 600 000 cycles, the reinforcing elements are extracted from the elastomer matrix and the force at break Ft is measured. This force at break Ft is compared with the force at break Fr before the bending endurance test. The % dropoff Dt is given by the difference relationship (1−Ft/Fr) ·100, and the endurance is given by the relationship 100·Ft/Fr and is reported in Table 1.

Figure 5:
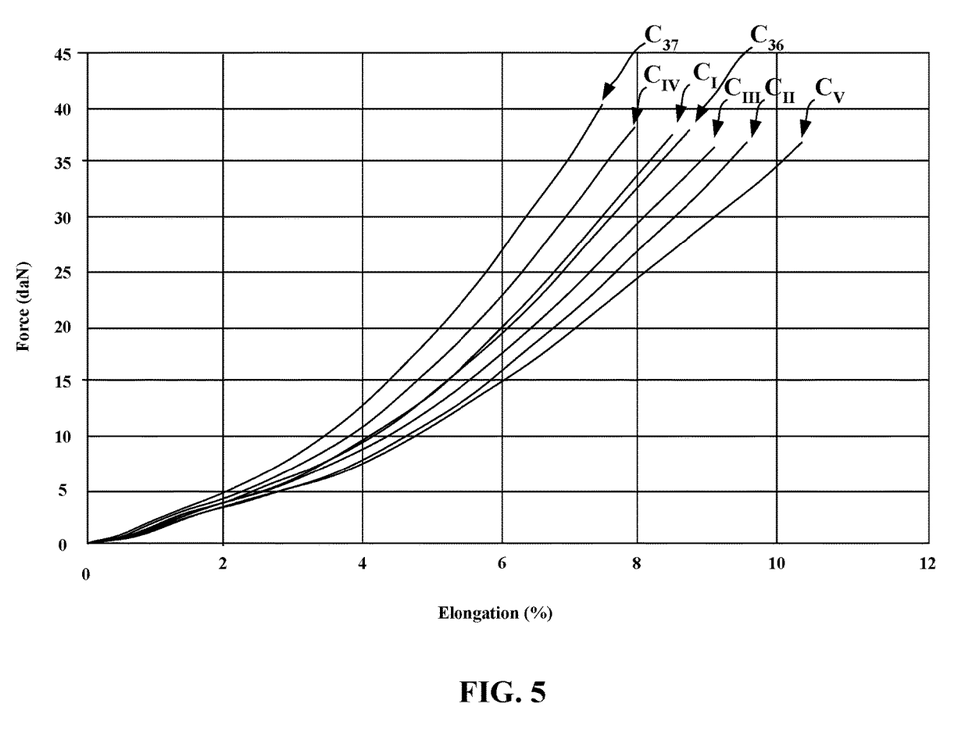
FIG. 5 represents force—elongation curves for various reinforcing elements.

FIG. 5 gives the force-elongation curves CI to CV, C36 and C37 of various comparative reinforcing elements I to V, 36 and 37 according to the invention.

TABLE 1

| | I | II | III | IV | V | 36 | 37 |
|---|---|---|---|---|---|---|---|
| Curve | $C_I$ | $C_{II}$ | $C_{III}$ | $C_{IV}$ | $C_V$ | $C_{36}$ | $C_{37}$ |
| R1' (t · m$^{-1}$)/D1' | 290/Z | 290/Z | 240/Z | 240/Z | 340/Z | 240/Z | 240/Z |
| R2' (t · m$^{-1}$)/D2' | 290/Z | 290/Z | 240/Z | 240/Z | 340/Z | 290/Z | 290/Z |
| R1 (t · m$^{-1}$)/D1 | 0/S | 50/S | 100/S | 50/S | 0/S | 100/S | 50/S |
| R2 (t · m$^{-1}$)/D2 | 0/S | 50/S | 100/S | 50/S | 0/S | 50/S | 0/S |
| R3 (t · m$^{-1}$)/D3 | 290/S | 340/S | 340/S | 290/S | 340/S | 340/S | 290/S |
| Twist factor | 136 | 160 | 160 | 136 | 160 | 160 | 136 |
| Endurance | 100 | NM | NM | 94 | >100 | 170 | 100 |
| Force at break (daN) | 38.3 | 36.6 | 36.5 | 38.3 | 36.8 | 38.1 | 39.8 |

The indication NM indicates that the value was not measured.

A comparison between the reinforcing elements I and V illustrates the known effect of the twist R3 on the force at break and endurance mentioned in the preamble of the present application. By increasing from R3=290 t·m$^{-1}$ (I) to R3=340 t·m$^{-1}$ (VI), the endurance is improved, but the force at break of the reinforcing element is reduced.

A comparison between the reinforcing elements I, II and III shows that two residual twists R1, R2, such that R1=R2, do not make it possible to compensate for the drop in force at break which is associated with the increase in twist R3 of the reinforcing element.

A comparison between the reinforcing elements I and IV shows that two residual twists R1, R2, such that R1=R2, while keeping a twist R3 identical to the reinforcing element I lead to a force at break that remains the same, but with still a drop in endurance.

A comparison between the reinforcing elements I and 36 shows that, in accordance with the invention, two residual twists R1, R2, with R1 such that R1>R2, make it possible to obtain both a force at break that is equivalent to that of the control I and an endurance that is very markedly improved by comparison with that of the control I because of a twist R3=340 t·m$^{-1}$ higher than that of the control (R3=290 t·m$^{-1}$).

A comparison between the reinforcing elements I and 37 shows that, in accordance with the invention, two residual twists R1, R2, with R1 such that R1>R2, make it possible to obtain both an endurance that is equivalent to that of the control I and a force at break that is improved because of a twist equal to that of the control I (R3=290 t·m$^{-1}$).

A comparison between the reinforcing elements IV and 37 shows that, for the same twist R3=290 t·m$^{-1}$, the substantially non-zero two residual twists R1, R2 such that R1=R2 of the reinforcing element IV lead to a drop in endurance by comparison with the control I unlike the reinforcing element 37 in which, for this same twist R3=290 t·m$^{-1}$, R1>R2 allows the force at break to be improved without reducing the endurance.

The invention is not limited to the embodiments described above.

Specifically, the carcass reinforcement 32 of the tire could comprise two carcass plies 34.

An embodiment could also be conceived of in which the turnup 40 extends up between the crown ply 18, and the main strand 38.

It will also be possible to combine the characteristics of the various embodiments described or envisaged above, with the proviso that these characteristics are compatible with one another.

The invention claimed is:

1. A reinforcing element comprising:
   a single strand of high-modulus textile monofilaments; and
   a single strand of low-modulus textile monofilaments,
   wherein the strand of high-modulus textile monofilaments and the strand of low-modulus textile monofilaments are wound around each other in a direction D3 with a twist R3,
   wherein the strand of high-modulus textile monofilaments has a residual twist R1 in a direction D1,
   wherein the strand of low-modulus textile monofilaments has a residual twist R2 in a direction D2,
   wherein the residual twists R1 and R2 have a relationship such that: when R2 is substantially non-zero, R1>R2, and when R2 is substantially zero, R1 is substantially non-zero, and
   wherein the directions D1, D2, and D3 are identical when R2 is substantially non-zero, and the directions D1 and D3 are identical when R2 is substantially zero.

2. The reinforcing element according to claim 1, wherein the high-modulus textile monofilaments are made of an aromatic polyamide.

3. The reinforcing element according to claim 1, wherein the low-modulus textile monofilaments:
   are made of a material selected from a group including: celluloses, polyvinyl alcohols, polyketones, aliphatic polyamides, polyesters, polybenzazoles, and polyimides, or
   are a mixture of monofilaments each made of a material selected from the group.

4. The reinforcing element according to claim 1, wherein R3 is in a range of from 200 twists per meter to 450 twists per meter.

5. The reinforcing element according to claim 1, wherein a twist factor of the reinforcing element is in a range of from 130 to 200.

6. The reinforcing element according to claim 1, wherein R1 is in a range of from 10 twists per meter to 150 twists per meter.

7. The reinforcing element according to claim 1, wherein, when R2 is substantially non-zero, R2 is in a range of from 10 twists per meter to 100 twists per meter.

8. The reinforcing element according to claim 1, wherein a ratio R1/R3 is in a range of from 0.05 to 0.45.

9. The reinforcing element according to claim 1, wherein a product R1×R3 is greater than or equal to 3000.

10. The reinforcing element according to claim 1, wherein:
    a ratio R3/R2 is in a range of from 0.10 to 10.50, and
    R3 is in a range of from 200 twists per meter to 450 twists per meter.

11. The reinforcing element according to claim 1, wherein a ratio R1/R2 is in a range of from 1.90 to 10.00.

12. The reinforcing element according to claim 1, wherein a count T1 of the strand of high-modulus textile monofilaments is in a range of from 90 tex to 400 tex.

13. The reinforcing element according to claim 1, wherein a count T2 of the strand of low-modulus textile monofilaments is in a range of from 80 tex to 350 tex.

14. A semifinished product, comprising:
    a reinforcing element according to claim 1; and
    an elastomer,
    wherein the reinforcing element is embedded in a matrix of the elastomer.

15. A tire comprising a reinforcing element according to claim 1.

16. The tire according to claim 15, further comprising:
    two beads, each of the beads including an annular reinforcing structure; and
    a carcass reinforcement anchored in each of the beads by a turnup around the annular reinforcing structure,
    wherein the carcass reinforcement includes the at least one reinforcing element.

17. A method of manufacturing a reinforcing element, the method comprising steps of:
    obtaining a strand of high-modulus textile monofilaments having an initial twist R1' in a direction D1';
    obtaining a strand of low-modulus textile monofilaments having an initial twist R2' in a direction D2'; and
    winding the strand of high-modulus textile monofilaments and the strand of low-modulus textile monofilaments around each other in a direction D3 with a twist R3 so that: the strand of high-modulus textile monofilaments has a residual twist R1 in a direction D1, and the strand of low-modulus textile monofilaments has a residual twist R2 in a direction D2,
    wherein the residual twists R1 and R2 have a relationship such that: when R2 is substantially non-zero, R1>R2, and when R2 is substantially zero, R1 is substantially non-zero, and
    wherein the directions D1, D2, and D3 are identical when R2 is substantially non-zero, and the directions D1 and D3 are identical when R2 is substantially zero.

18. The method according to claim 17, wherein R1'<R2'.

19. The method according to claim 17, wherein R1'<R3.

20. The method according to claim 17, wherein D1' and D2' are identical.

21. A reinforcing element comprising:
    a single strand of high-modulus textile monofilaments; and
    a single strand of low-modulus textile monofilaments,
    wherein the strand of high-modulus textile monofilaments and the strand of low-modulus textile monofilaments are wound around each other in a direction D3 with a twist R3,
    wherein the strand of high-modulus textile monofilaments has a residual twist R1 in a direction D1,
    wherein the strand of low-modulus textile monofilaments has a residual twist R2 in a direction D2,
    wherein the residual twists R1 and R2 have a relationship such that: when R2 is substantially non-zero, R1>R2, and when R2 is substantially zero, R1 is substantially non-zero, and
    wherein a twist factor of the reinforcing element is in a range of from 130 to 200.

22. A reinforcing element comprising:
    a single strand of high-modulus textile monofilaments; and
    a single strand of low-modulus textile monofilaments,
    wherein the strand of high-modulus textile monofilaments and the strand of low-modulus textile monofilaments are wound around each other in a direction D3 with a twist R3,
    wherein the strand of high-modulus textile monofilaments has a residual twist R1 in a direction D1,
    wherein the strand of low-modulus textile monofilaments has a residual twist R2 in a direction D2,
    wherein the residual twists R1 and R2 have a relationship such that: when R2 is substantially non-zero, R1>R2, and when R2 is substantially zero, R1 is substantially non-zero, and
    wherein, when R2 is substantially non-zero, R2 is greater than or equal to 20 twists per meter.

23. A reinforcing element according to claim 22, wherein a ratio R1/R3 is in a range of 0.13 to 0.36,
wherein a ratio R3/R2 is in a range of from 2 to 8.25,
wherein R3 is in a range of from 250 twists per meter to 400 twists per meter,
wherein a ratio R1/R2 is in a range of from 1.90 to 5, and
wherein a product R1×R3 is greater than or equal to 15000.

24. A reinforcing element according to claim 22, wherein a ratio R1/R3 is in a range of 0.20 to 0.35,
wherein a ratio R3/R2 is in a range of from 2 to 7.10,
wherein R3 is in a range of from 280 twists per meter to 400 twists per meter,
wherein a ratio R1/R2 is in a range of from 1.90 to 2.5, and
wherein a product R1×R3 is greater than or equal to 15000.

25. A reinforcing element according to claim 24, wherein a count T1 of the strand of high-modulus textile monofilaments is in a range of 100 to 350 tex, and
wherein a count T2 of the strand of low-modulus textile monofilaments is in a range of 90 to 290 tex.

26. A reinforcing element according to claim 24, wherein a count T1 of the strand of high-modulus textile monofilaments is in a range of 140 to 210 tex, and
wherein a count T2 of the strand of low-modulus textile monofilaments is in a range of 120 to 190 tex.

27. A reinforcing element according to claim 24, wherein the high-modulus textile monofilaments have a final modulus greater than 25 cN/tex,
wherein the low-modulus textile monofilaments have a final modulus less than or equal to 25 cN/tex.

28. A reinforcing element according to claim 22, wherein a ratio R1/R2 is in a range of from 1.90 to 2.5.

29. A reinforcing element according to claim 22, wherein, when R2 is substantially non-zero, R2 in a range of from 20 twists per meter to 60 twists per meter.

30. The reinforcing element according to claim 22, wherein the low-modulus textile monofilaments are made of a material selected from a group including: celluloses, polyvinyl alcohols, polyketones, aliphatic polyamides, polybenzazoles, and polyimides.

* * * * *

UNITED STATES PATENT AND TRADEMARK OFFICE
CERTIFICATE OF CORRECTION

Page 1 of 1

PATENT NO. : 10,688,828 B2
APPLICATION NO. : 15/554583
DATED : June 23, 2020
INVENTOR(S) : Solenne Vallet et al.

It is certified that error appears in the above-identified patent and that said Letters Patent is hereby corrected as shown below:

On the Title Page

Item (56) "15/532,757, filed Dec. 7, 2015," should read --15/532,757, filed Dec. 7, 2015.
R. Cornille, U.S. Appl. No. 15/532,798, filed Dec. 7, 2015.--

In the Specification

Column 1:
Line 57, "matrix" should read --matrix.--

Column 1:
Line 58, "elements their" should read --elements, their--

Column 4:
Line 55, "polyamides" should read --polyamides,--

Column 13:
Line 5, "twist;" should read --twist,--

Column 18:
Line 14, "R2 in" should read --R2 is in--

Signed and Sealed this
Twentieth Day of April, 2021

Drew Hirshfeld
*Performing the Functions and Duties of the
Under Secretary of Commerce for Intellectual Property and
Director of the United States Patent and Trademark Office*